(12) United States Patent
Higuchi

(10) Patent No.: US 6,282,411 B2
(45) Date of Patent: Aug. 28, 2001

(54) MOBILE COMMUNICATION TERMINAL DEVICE

(75) Inventor: Koji Higuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/726,396

(22) Filed: Dec. 1, 2000

Related U.S. Application Data

(63) Continuation of application No. PCT/JP99/01739, filed on Apr. 2, 1999.

(51) Int. Cl.[7] .................................................. H04B 1/04
(52) U.S. Cl. ......................... 455/127; 455/574; 455/573; 455/126
(58) Field of Search ................................. 455/550, 575, 455/573, 574, 114, 115, 126, 127, 119, 116, 572, 259, 260; 375/295, 297, 300, 306, 307, 302

(56) References Cited

U.S. PATENT DOCUMENTS

| | | | |
|---|---|---|---|
| 4,188,579 | * 2/1980 | Yoshisato | 455/76 |
| 5,699,383 | * 12/1997 | Ichiyoshi | 375/297 |
| 5,825,640 | * 10/1998 | Quigley | 363/60 |
| 5,881,374 | * 3/1999 | Osterberg | 455/115 |
| 6,047,168 | * 4/2000 | Carlsson | 455/126 |

FOREIGN PATENT DOCUMENTS 10-154923  6/1998  (JP).

* cited by examiner

Primary Examiner—Vivian Chang
Assistant Examiner—John J. Lee
(74) Attorney, Agent, or Firm—Oblon, Spivak, McClelland, Maier & Neustadt, P.C.

(57) ABSTRACT

A mobile communication terminal device of the present invention includes: a voltage detector for detecting a battery voltage at the time of a voltage drop; a correction phase storage section for storing pieces of correction phase information each having a characteristic opposite to that of a phase error in a carrier wave produced due to a drop in the battery voltage; a correction phase outputting section for selecting correction phase information based on the battery voltage at the time of the voltage drop and outputting the selected correction phase information to a baseband modulator to change phase information in a baseband signal; and a modulator for modulating a carrier wave according to the baseband signal output from the correction phase outputting section so as to cancel the phase error included in the carrier wave.

7 Claims, 12 Drawing Sheets

FIG.21
(PRIOR ART)

| TRANSMISSION POWER CONTROL LEVEL | TRANSMISSION OUTPUT (dBm) |
|---|---|
| 5 | 33 |
| 6 | 31 |
| 7 | 29 |
| 8 | 27 |
| 9 | 25 |
| 10 | 23 |
| 11 | 21 |
| 12 | 19 |
| 13 | 17 |
| 14 | 15 |
| 15 | 13 |
| 16 | 11 |
| 17 | 9 |
| 18 | 7 |
| 19 | 5 | though the transmission

MOBILE COMMUNICATION TERMINAL DEVICE

CROSS-REFERENCE TO THE RELATED APPLICATION

This Application is a continuation of International Application No. PCT/JP99/01739, whose International filing date is Apr. 2, 1999, the disclosures of which Application are incorporated by reference herein.

BACKGROUND OF THE INVENTION

1. Field of the Invention

The present invention relates to a battery-powered mobile communication terminal device.

2. Description of the Related Art

In recent mobile communication terminal devices such as cellular phones, battery voltages employed have been lowered as the operational voltages of the internal circuits have been decreased. On the other hand, lithium ion batteries have become widely used because they have an advantage in battery capacity and weight. FIG. 16 is a block diagram showing the configuration of a transmitting section of a conventional mobile communication terminal device; FIG. 17 is an explanatory diagram illustrating a relationship between an input signal and its modulation frequencies; FIG. 18 is an explanatory diagram illustrating the output phase of a baseband signal output from a baseband modulator; FIG. 19 is an explanatory diagram illustrating phase errors included in a carrier wave; FIG. 20 is an explanatory diagram illustrating the output phase of a transmission signal output from a quadrature modulator; and FIG. 21 is a diagram showing a relationship between transmission power control levels and their transmission outputs in a digital portable phone using the GSM system.

Referring to FIG. 16, reference numeral 8 denotes a microphone; 9 denotes a control section; 10 denotes a baseband modulator; 11 denotes a modulation phase generating section; 12 denotes a phase adder; 13 denotes a phase converter; and 14 denotes a D/A converter. The baseband modulator 10 is composed of the modulation phase generating section 11, the phase adder 12, the phase converter 13, and the D/A converter 14. Reference numeral 15 denotes a quadrature modulator for modulating a carrier wave according to a baseband signal and outputting a transmission signal; 16 denotes a transmission local oscillator for receiving a battery voltage supply and generating a carrier wave; 17 denotes a battery for supplying a voltage to each circuit; 18 denotes a voltage regulator for regulating the battery voltage output from the battery 17 to a constant voltage, and outputting it to the transmission local oscillator 16; 19 denotes a transmission power amplifier for amplifying the transmission signal to a predetermined transmission output level; 20 denotes a transmission ON/OFF control section for controlling the ON/OFF states of the transmission power amplifier 19; and 21 denotes an antenna for transmitting the transmission signal amplified by the transmission power amplifier 19.

Two power supply routes are used for driving the mobile communication terminal device shown in FIG. 16. One route directly supplies power from the battery 17 to the transmission power amplifier 19, while the other supplies a regulated, substantially constant voltage to the transmission local oscillator 16 through the voltage regulator 18. To efficiently drive a circuit consuming a particularly large power, such as the transmission power amplifier 19, it is necessary to directly connect the circuit to the battery 17 for power supply. On the other hand, power is supplied through the voltage regulator 18 to circuits such as the transmission local oscillator 16 which do not require large amounts of power but require a stable power supply.

The transmission local oscillator 16 generates a radio frequency wave having a predetermined frequency used as a carrier wave, and the phase and frequency of the carrier wave generated by the transmission local oscillator 16 are modulated by the quadrature modulator 15 according to a baseband signal. Therefore, it is especially important to supply a stable voltage to the transmission local oscillator 16, which generates a carrier wave, in order to ensure communication quality.

Next, description will be made of the operation of the transmission section of the mobile communication terminal device. An analog voice signal entered from the microphone 8 is converted into a digital voice signal (1/0 signal) in the control section 9. Then, the digital voice signal subjected to a voice coding process is arranged in the TDMA (Time Division Multiple Access) transmission format, and output to the modulation phase generating section 11 of the baseband modulator 10. FIG. 17 shows frequencies of the digital voice signal (1/0 signal) after it is passed through a Gaussian filter. Each frequency is equivalent to a variation in phase per unit time, or a microphase, indicated by a hatched portion in FIG. 17.

The modulation phase generating section 11 generates a microphase according to input transmission data, and outputs it to the phase adder 12. Microphases output from the modulation phase generating section 11 are integrated (added by the phase adder 12) into the phase information shown in FIG. 18. The phase converter 13 converts the phase information output from the phase adder 12 into inphase components I and quadrature components Q, namely an I digital modulation signal and a Q digital modulation signal, and outputs them to the D/A converter 14. The D/A converter 14, in turn, converts the I and Q digital modulation signals output from the phase converter 13 into I and Q analog modulation signals, and then outputs them to the quadrature modulator 15 as baseband signals.

The transmission local oscillator 16 receives a battery voltage supply output from the voltage regulator 18 to generate carrier waves, and outputs the generated carrier waves to the quadrature modulator 15. The quadrature modulator 15 modulates the carrier waves according to the I and Q analog modulation signals. Specifically, the two carrier waves which are 90 degrees out of phase with each other (local oscillation signals generated in the transmission local oscillator 16) are each multiplied by one of the I and Q analog modulation signals, and combined to produce and output a transmission signal to the transmission power amplifier 19.

Since a mobile communication terminal device using the TDMA method makes transmission during only assigned time periods (time slots), the transmission power amplifier 19 is controlled so that it is turned ON only during such time-slot transmissions, and turned OFF otherwise. Such ON/OFF control is performed by the transmission ON/OFF control section 20. The transmission signal amplified to a predetermined transmission output level by the transmission power amplifier 19 is output from the antenna 21 as a transmission wave. The transmission output of the transmission power amplifier 19 is controlled according to transmission power control levels, shown in FIG. 21, employed in digital portable phones using the GSM system.

Incidentally, since the battery 17, which supplies power to the mobile communication terminal device, has a limited power supply capacity, the battery voltage supplied to the circuits momentarily (for about a few tens of $A\mu$ seconds) drops when a large amount of power consumption occurs. Specifically, when the transmission ON/OFF control section 20 turns ON the transmission power amplifier 19 at the time of starting a transmission for a time slot, power consumption occurs to amplify the transmission signal, momentarily lowering the output voltage of the battery 17.

When the battery voltage output from the battery 17 is lowered due to the initiation of operation of the transmission power amplifier 19, the regulator output voltage from the voltage regulator 18, which regulates the battery voltage to a substantially constant voltage, also momentarily drops. Since the transmission local oscillator 16 receives a voltage supply from the voltage regulator 18, a drop in the regulator output voltage disturbs the oscillation frequency of the transmission local oscillator 16, producing a phase error in a generated carrier wave as shown in FIG. 19. When a carrier wave including such a phase error is output to the quadrature modulator 15, and modulated according to a baseband signal, the transmission signal sent from the antenna 21 after it is amplified by the transmission power amplifier 19 also includes a phase error, resulting in deteriorated communication quality, as shown in FIG. 20.

Furthermore, when a lithium ion battery having a large internal impedance is used as the battery 17, or when the battery 17 has been exhausted and as a result, the magnitude of a battery voltage which can be generated itself has been lowered, the magnitude of a voltage drop at the time of starting the operation of the transmission power amplifier 19 increases. Specifically, as the remaining capacity of the battery 17 decreases, the degree of a phase error included in a carrier wave increases, resulting in greater deterioration of modulation accuracy. Accordingly, when the remaining battery capacity has become lower than a predetermined value, it is necessary to replace the battery 17 considering maintenance of communication quality, which is a problem from the viewpoint of efficient use of the battery 17.

SUMMARY OF THE INVENTION

In order to solve the above problems, it is an object of the present invention to prevent deterioration of modulation accuracy due to a drop in a battery voltage which occurs when a circuit having a large power consumption, such as a transmission power amplifier, is driven.

According to the present invention, a mobile communication terminal device comprises: a local oscillator for receiving a battery voltage supply, and generating a carrier wave which includes a phase error produced due to a variation of the battery voltage; a voltage detector for detecting the battery voltage supplied to the local oscillator; a correction phase storage section for storing pieces of correction phase information each corresponding to a phase error in the carrier wave; a correction phase outputting section for selectively outputting the correction phase information according to the battery voltage detected by the voltage detector; a baseband modulator for outputting a baseband signal which includes phase information corresponding to input transmission data, the phase information being changed according to the correction phase information; and a modulator for modulating the carrier wave according to the baseband signal whose phase information has been changed.

According to another aspect of the present invention, in the mobile communication terminal device, the voltage detector detects an output voltage of a voltage regulator at initiation of operation of an amplifier which amplifies a transmission signal output from the modulator, the voltage regulator regulating the battery voltage supplied to the local oscillator to a substantially constant voltage.

According to still another aspect of the present invention, in the mobile communication terminal device, the correction phase outputting section selectively outputs correction phase information according to both a battery voltage and battery type information output from a battery type identifying section which identifies a battery type, and generates the battery type information.

According to yet another aspect of the present invention, in the mobile communication terminal device, the correction phase outputting section selectively outputs correction phase information according to both a battery voltage and a transmission output of an amplifier which amplifies a transmission signal output from the modulator.

According to still a further aspect of the present invention, in the mobile communication terminal device, the correction phase outputting section selectively outputs correction phase information according to both a battery voltage and temperature information output from a temperature detector which detects a temperature of the terminal device.

According to yet another aspect of the present invention, in the mobile communication terminal device, the correction phase outputting section outputs correction phase information to the baseband modulator at initiation of operation of an amplifier which amplifies a transmission signal output from the modulator.

According to still another aspect of the present invention, a mobile communication terminal device comprises: a local oscillator for receiving a battery voltage supply, and generating a carrier wave which includes a phase error produced due to a variation of the battery voltage; a modulator for modulating the carrier wave to generate a transmission signal; a baseband demodulator having a correction phase calculating section for measuring the phase error from a demodulated signal obtained by demodulating the transmission signal to calculate correction phase information, and a correction phase outputting section for outputting the correction phase information; and a baseband modulator for outputting to the modulator a baseband signal which includes phase information corresponding to input transmission data, the phase information being changed according to the correction phase information.

BRIEF DESCRIPTION OF THE DRAWINGS

FIG. 21 is a diagram showing a relationship between transmission power control levels and their transmission outputs in a digital portable phone using the GSM system.

DETAILED DESCRIPTION OF THE PREFERRED EMBODIMENTS

In order to describe the present invention in greater detail, the preferred embodiments will be outlined below with reference to the accompanying figures.

First Embodiment

Figure 1:
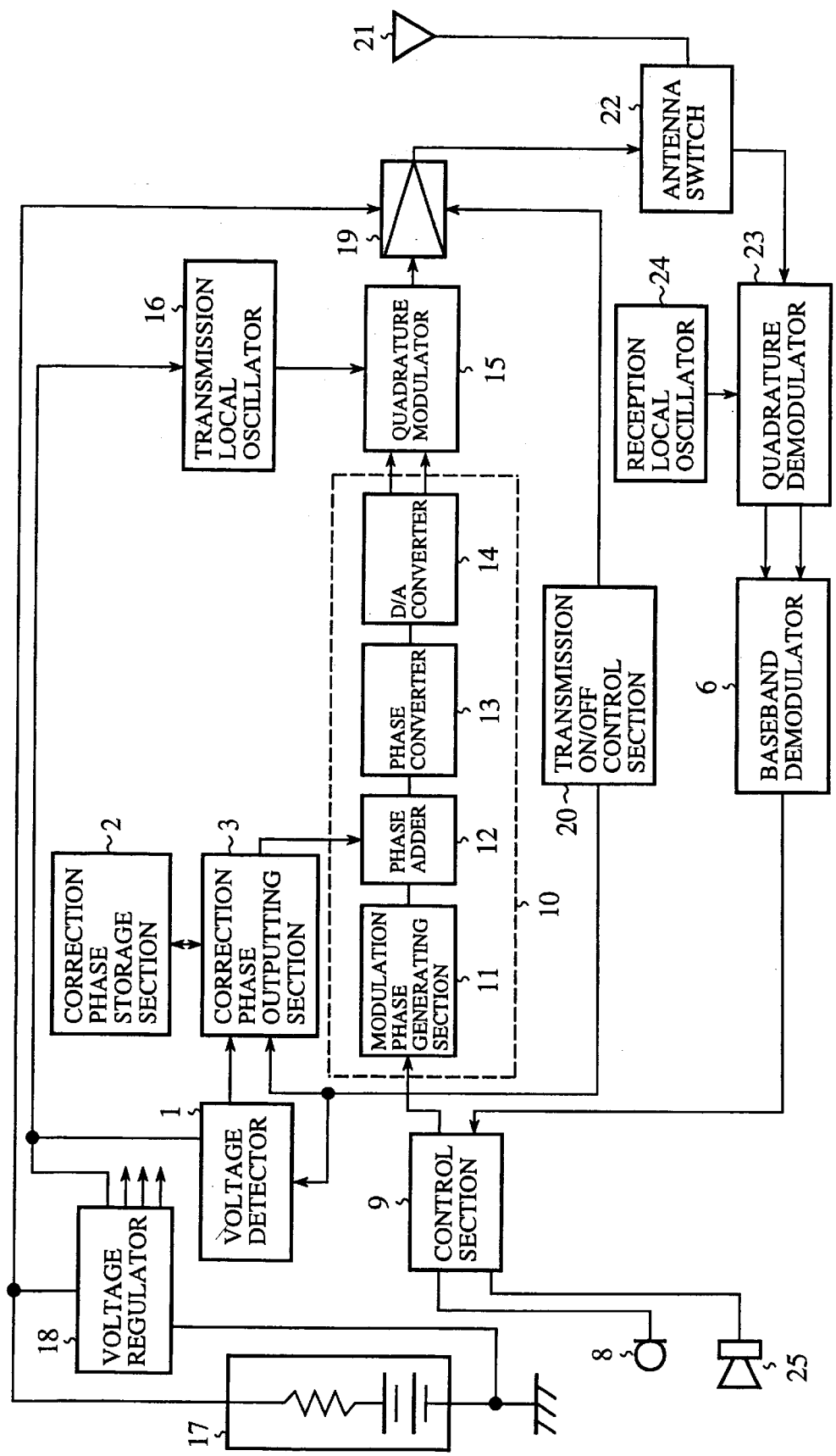
FIG. 1 is a block diagram showing a mobile communication terminal device according to a first embodiment of the present invention.
Figure 16:
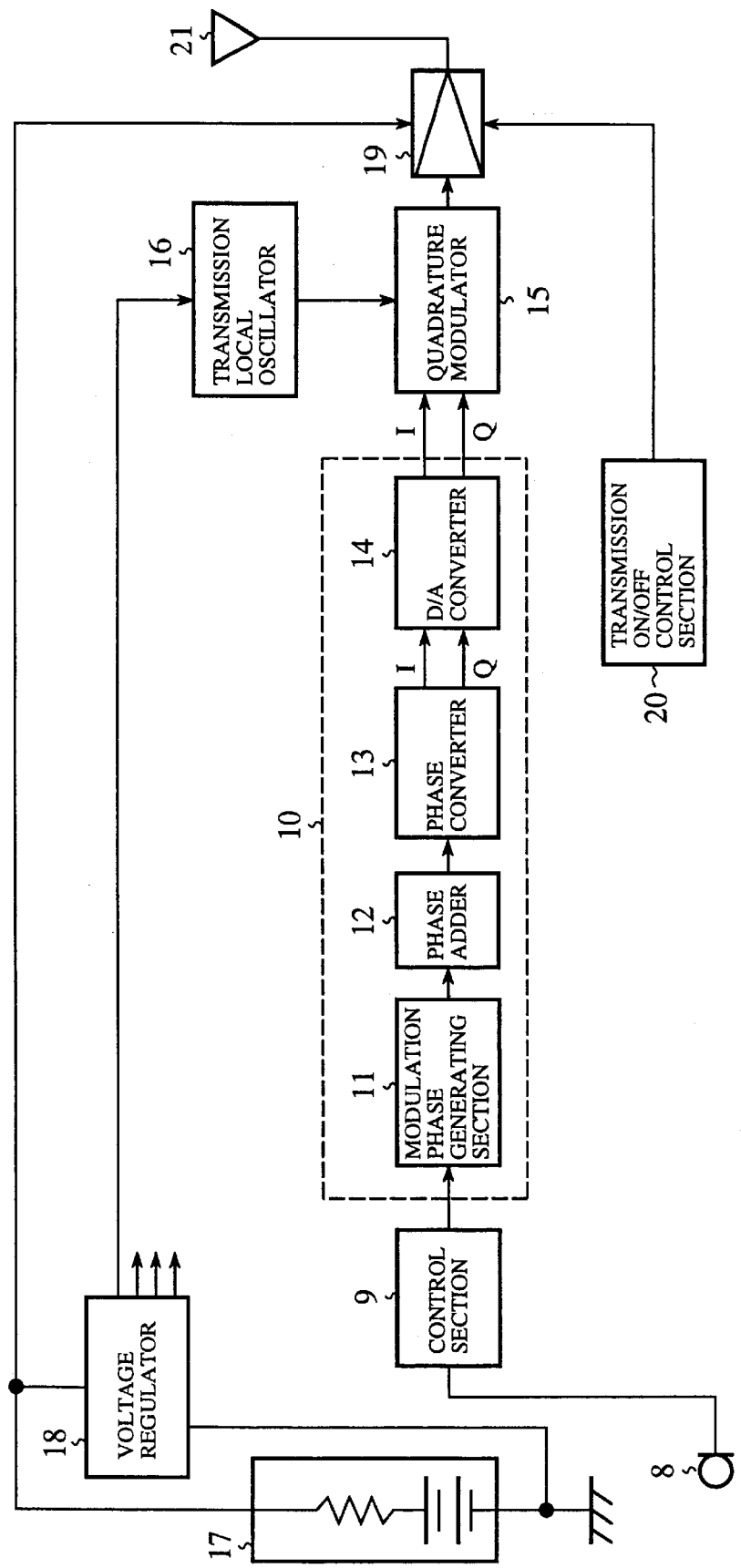
FIG. 16 is a block diagram showing the configuration of a conventional mobile communication terminal device.
Figure 17:
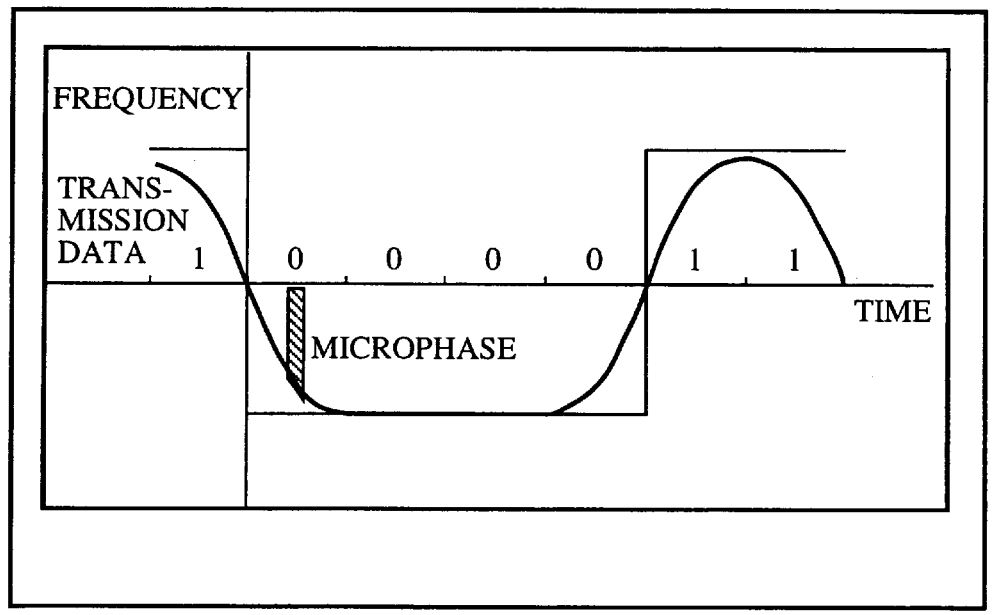
FIG. 17 is an explanatory diagram illustrating a relationship between an input signal and its modulation frequencies.
Figure 18:
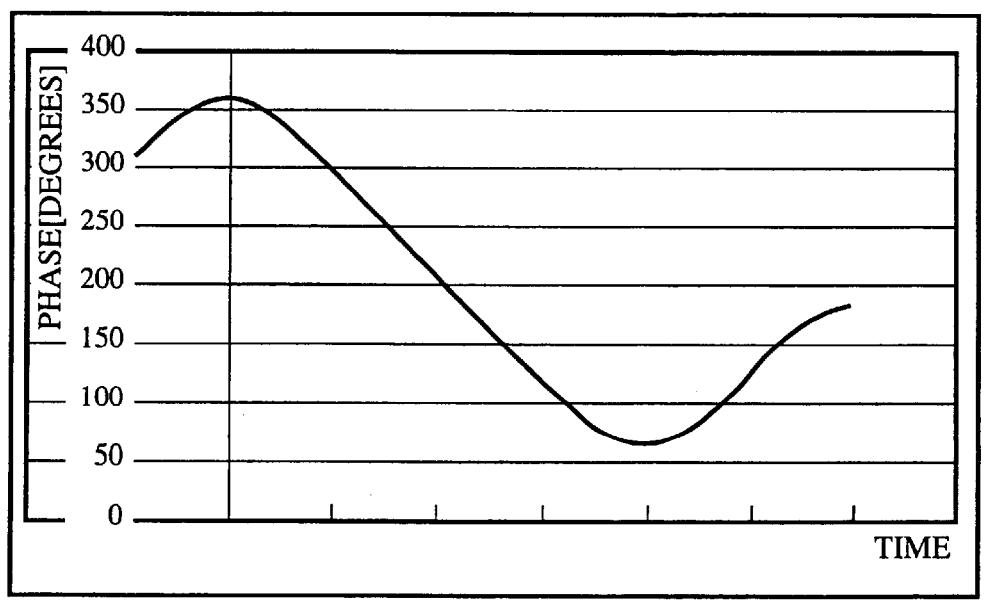
FIG. 18 is an explanatory diagram illustrating the output phase of a baseband signal output from a baseband modulator.

FIG. 1 is a block diagram showing a mobile communication terminal device according to a first embodiment of the present invention. Referring to FIG. 1, reference numeral 1 denotes a voltage detector for detecting the output voltage of a voltage regulator 18; 2 denotes a correction phase storage section for storing pieces of correction phase information each having a characteristic opposite to that of a phase error included in a carrier wave, the phase error being produced due to a voltage drop; and 3 denotes a correction phase outputting section for selectively outputting to a phase adder 12 correction phase information according to a battery voltage detected by the voltage detector 1 when a voltage drop occurs. It should be noted that since components in FIG. 1 which are the same as or correspond to those in FIG. 16 are denoted by like numerals, the explanation of those components will be omitted.

Figure 2:
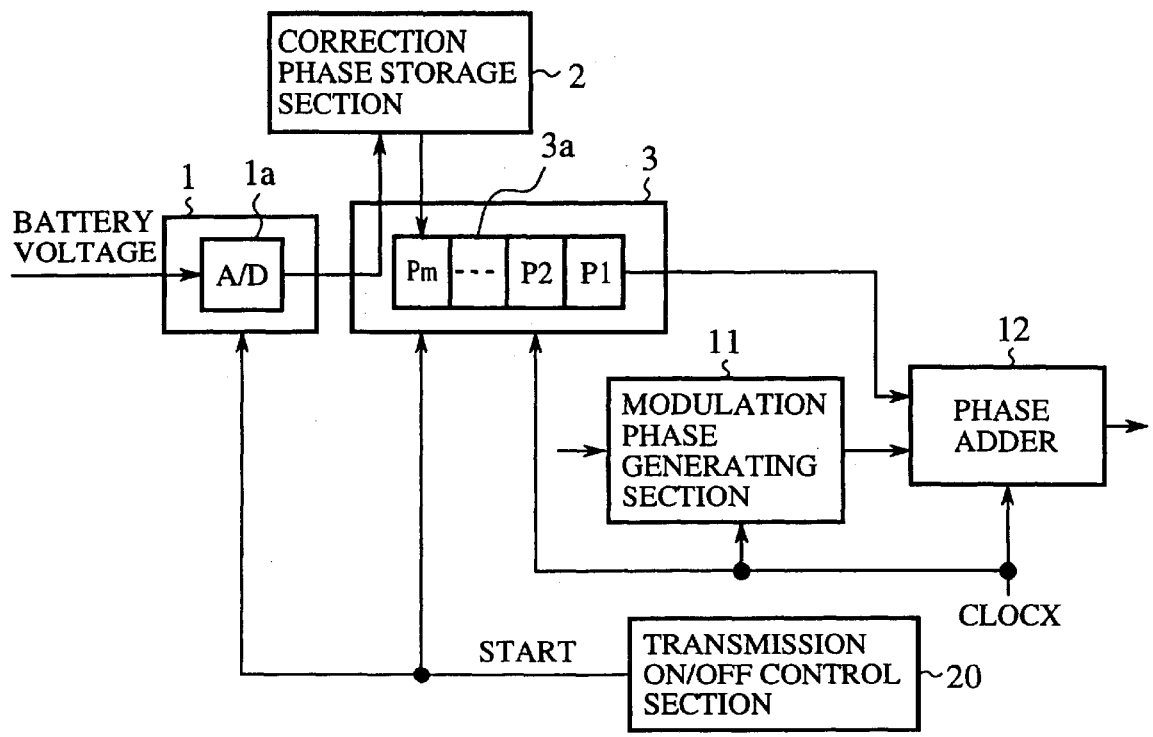
FIG. 2 is a block diagram showing a correction phase outputting section of a mobile communication terminal device according to the first embodiment of the present invention.

FIG. 2 is a block diagram showing a correction phase outputting section of a mobile communication terminal device according to the first embodiment of the present invention. Reference numeral 1a denotes an A/D converter incorporated in the voltage detector 1, while 3a denotes correction phase information selected from the correction phase storage section 2.

Figure 3:
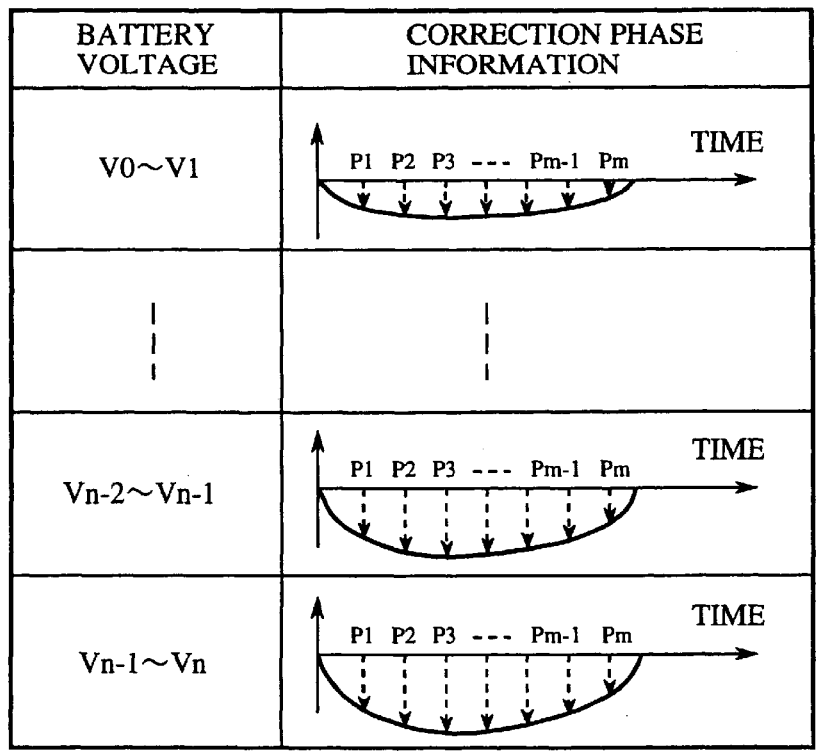
FIG. 3 is a diagram showing a table which stores correction phase information corresponding to battery voltages produced at the time of voltage drops.

FIG. 3 is a diagram showing a table which stores correction phase information corresponding to battery voltages produced at the time of voltage drops. This table is stored in the correction phase storage section 2. Each piece of stored correction phase information has a characteristic opposite to that of a phase error included in a carrier wave. Correction phase information corresponding only to the time periods when voltage drops are produced is stored.

In the present invention, phase information in a baseband signal is changed by use of correction phase information having a characteristic opposite to that of a phase error generated in a carrier wave due to a voltage drop. This baseband signal is output to a quadrature modulator in which the phase error included in the carrier wave is cancelled by the correction phase information included in the baseband signal.

A phase error is produced in a carrier wave due to a drop in a battery voltage supplied to the transmission local oscillator 16. Therefore, in order to select correction phase information having a characteristic opposite to that of a phase error produced in a carrier wave, it is necessary to accurately detect a battery voltage when a voltage drop occurs. That is, it is necessary to detect a battery voltage at the time of a voltage drop so as to estimate the magnitude of a phase error included in a carrier wave, and select correction phase information having a characteristic opposite to that of the phase error. To accomplish the above object, a mobile communication terminal device according to the present invention comprises the voltage detector 1 for accurately detecting a battery voltage at the time of a voltage drop, and selects correction phase information according to this battery voltage.

A mobile communication terminal device of the first embodiment will be described with reference to FIGS. 1 and 2. The voltage detector 1 is connected to a transmission ON/OFF control section 20 so that a transmission ON signal, which is used by the transmission ON/OFF control section 20 to turn ON a transmission power amplifier 19, is input to the voltage detector 1. Upon receiving the transmission ON signal, the voltage detector 1 detects a battery voltage, and converts the analog voltage information into digital voltage information by use of its built-in A/D converter 1a. Since the voltage detector 1 detects a voltage at initiation of operation of the transmission power amplifier 19, the voltage detector 1 can accurately obtain the minimum voltage produced at the time of a voltage drop.

As in the case with the voltage detector 1, the correction phase outputting section 3 is connected to the transmission ON/OFF control section 20 so that the transmission ON signal is input from the transmission ON/OFF control section 20 to the correction phase outputting section 3. The correction phase outputting section 3 selects correction phase information from the table in the correction phase storage section 2 according to a battery voltage detected by the voltage detector 1. Upon receiving the transmission ON signals, the correction phase outputting section 3 outputs pieces of correction phase information P1, P2, . . . Pm in synchronization with a baseband section operational clock, one by one, to the phase adder 12.

Figure 4:
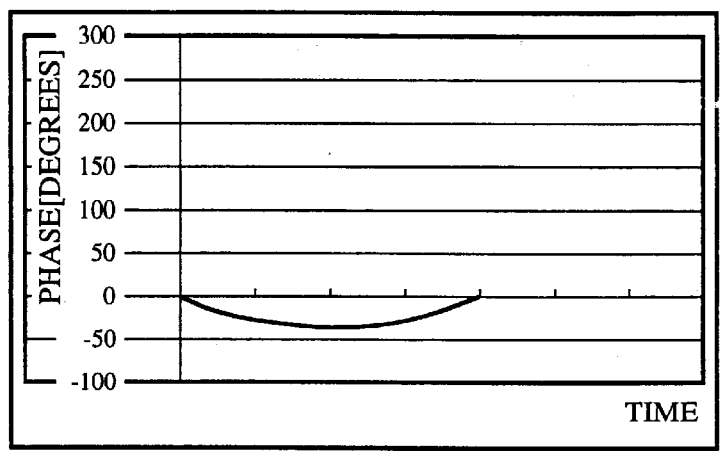
FIG. 4 is an explanatory diagram illustrating a correction phase.
Figure 19:
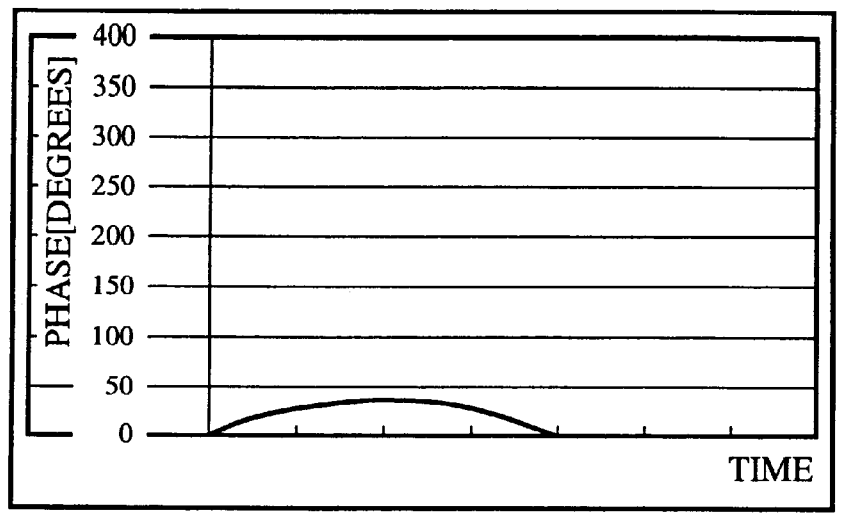
FIG. 19 is an explanatory diagram illustrating a phase error included in a carrier wave.
Figure 20:
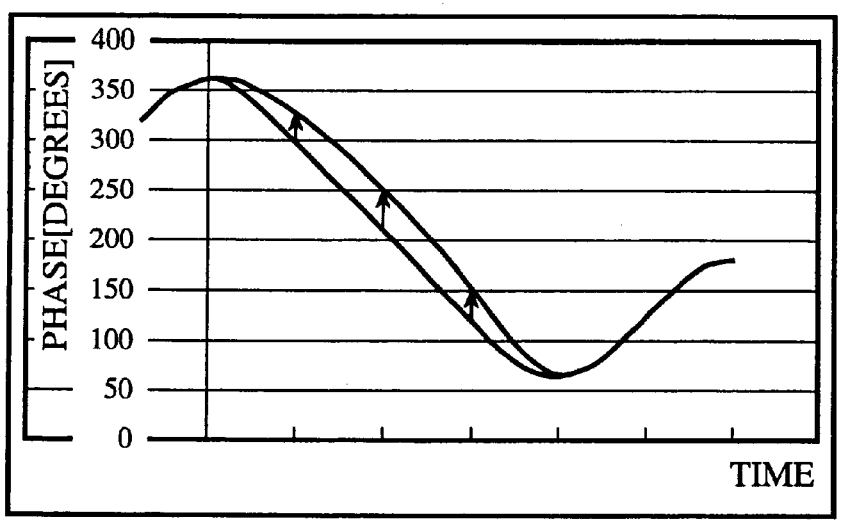
FIG. 20 is an explanatory diagram illustrating the output phase of a transmission signal output from a quadrature modulator.

The phase adder 12 includes correction phase information, shown in FIG. 4, having a characteristic opposite to that of a phase error shown in FIG. 19, into a baseband signal by adding the correction phase information to the baseband signal. The phase adder 12 is composed of, for example, registers and operates in synchronization with the above clock so as to be able to change phase information in the baseband signal for each clock.

Figure 5:
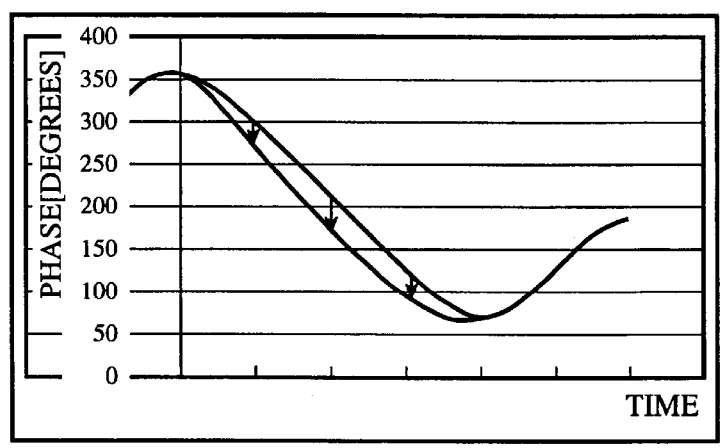
FIG. 5 is an explanatory diagram illustrating the output phase of a baseband signal.
Figure 6:
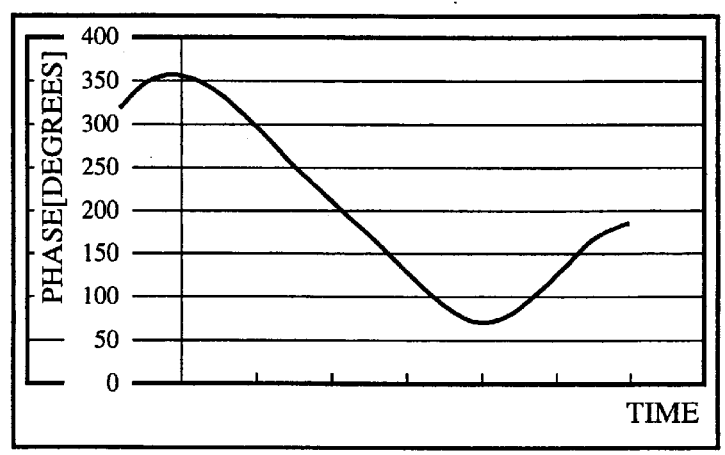
FIG. 6 is an explanatory diagram illustrating the output phase of a transmission signal after it has been phase-corrected.

A baseband signal whose phase information has been changed by use of the correction phase information shown in FIG. 4 includes the correction phase information, as shown in FIG. 5. This baseband signal is output to the quadrature modulator 15 through a phase converter 13 and a D/A converter 14. The quadrature modulator 15 multiplies and thereby modulates a carrier wave, which includes a phase error shown in FIG. 19, by the baseband signal, shown in FIG. 5, which includes correction phase information shown in FIG. 4 so that the phase error in the carrier wave is cancelled by the correction phase information in the baseband signal in order to output to the transmission power amplifier 19 a transmission signal whose carrier wave has its phase error removed as shown in FIG. 6. Accordingly, it is possible to prevent deterioration of modulation accuracy, enhancing communication quality.

It should be noted that although the mobile communication terminal device according to the first embodiment of the present invention selects correction phase information using the output voltage of the voltage regulator 18, correction phase information may be selected using a voltage supplied to the transmission power amplifier 19.

Further, the table in the correction phase storage section can store information on a phase whose magnitude is equal to the magnitude of a phase error included in a carrier wave, and the phase adder can perform a process in which the phase information is given a characteristic opposite to that of the phase error in the carrier wave in order to include correction phase information having a characteristic opposite to that of the phase error, into a baseband signal. In short, a baseband signal output from the baseband modulator to the quadrature modulator needs to include correction phase information having a characteristic opposite to that of a phase error in a carrier wave.

Further, the table shown in FIG. 3 storing battery voltages and correction phase information may be created based on actual measurements. For example, a table storing battery voltages and correction phase information may be created by using a pseudo-power supply whose output voltage can be set, instead of using a battery, and measuring a phase error in a transmission signal output from an antenna 21 by use of an external measuring device.

As described above, the mobile communication terminal device according to the first embodiment of the present invention selects correction phase information having a characteristic opposite to that of a phase error according to a battery voltage at the time of a voltage drop, and outputs the selected correction phase information to the phase adder 12. Phase information in a baseband signal is changed based on this correction phase information so that in the quadrature modulator 15, a phase error in a carrier wave is cancelled by the correction phase information included in the baseband signal. Thus, the modulation accuracy is improved, resulting in enhanced communication quality.

Further, since the mobile communication terminal device according to the first embodiment of the present invention selects correction phase information by which a phase error included in a carrier wave can be cancelled according to a voltage at the time of a voltage drop, stable modulation accuracy and communication quality can be ensured even when the remaining battery capacity has become scarce. Thus, usage time of a battery can be extended.

In the above description of the present invention, a phase error in a carrier wave produced due to a voltage drop is cancelled. However, a phase error in a carrier wave produced due to a transient voltage rise can also be cancelled. That is, the correction phase storage section 2 can store correction phase information having a characteristic opposite to that of a phase error produced at the time of a voltage rise beforehand, and correction phase information selected by the correction phase outputting section 3 based on a battery voltage detected by the voltage detector 1 at the time of a voltage rise can be included in a baseband signal so that a phase error in a carrier wave is cancelled in the quadrature modulator 15, making it possible to prevent deterioration of modulation accuracy. Thus, the present invention is effective in preventing modulation accuracy from being deteriorated due to a transient voltage change, regardless of whether it is a voltage drop or a voltage rise.

Second Embodiment

Figure 7:
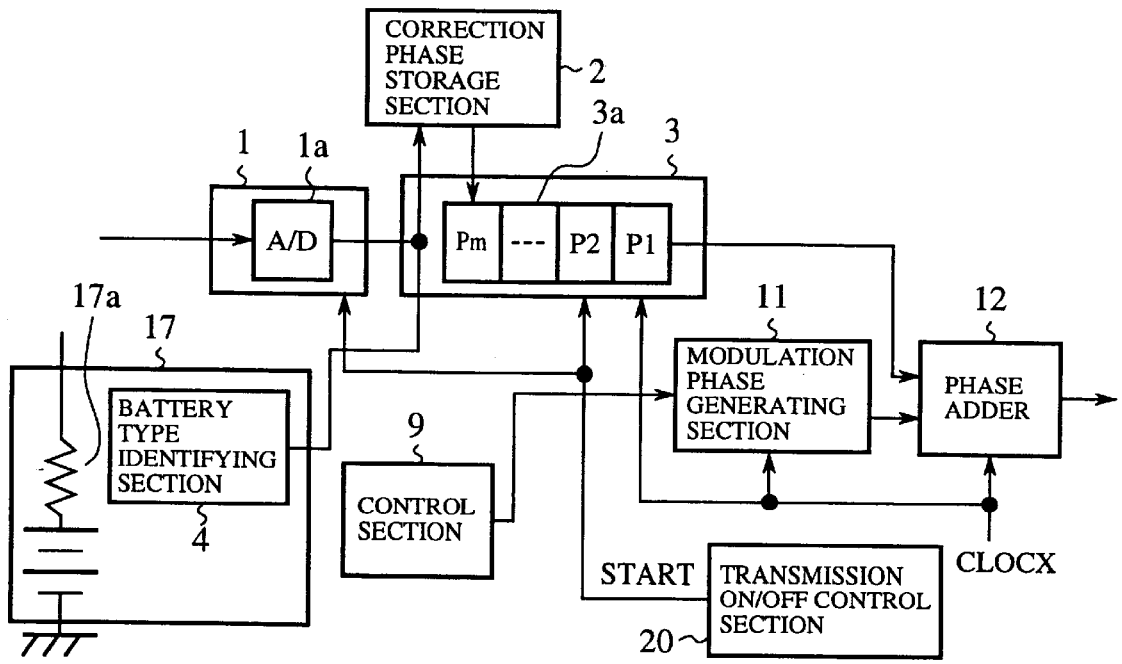
FIG. 7 is a block diagram showing a correction phase outputting section of a mobile communication terminal device according to a second embodiment of the present invention.
Figure 8:
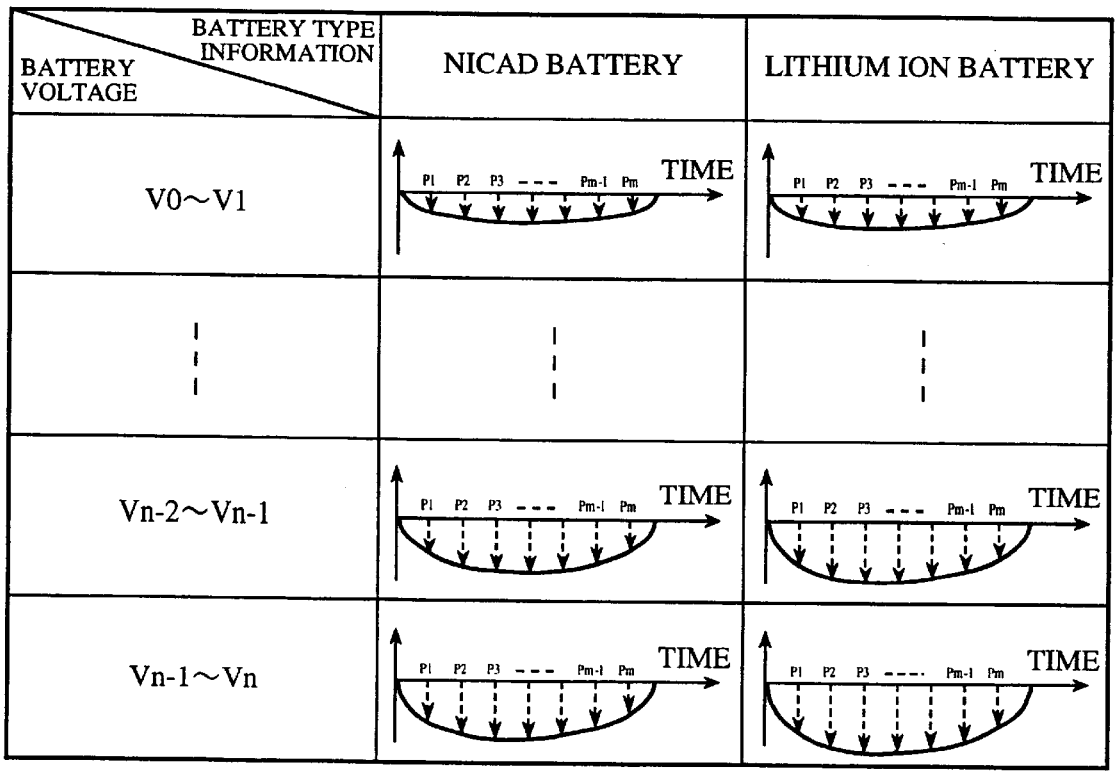
FIG. 8 is a diagram showing a table which stores correction phase information corresponding to both battery voltages produced at the time of voltage drops and battery types.
Figure 9:
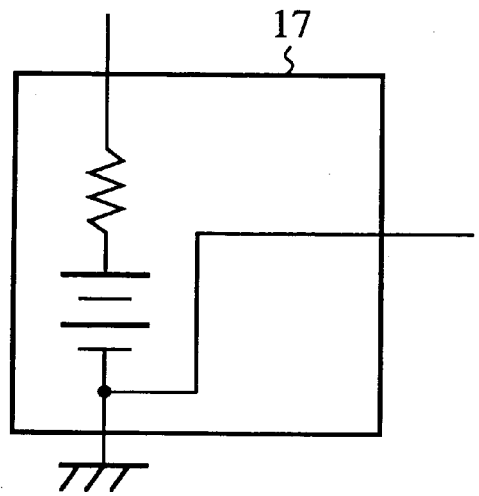
FIG. 9 is a block diagram showing the internal circuit of a nicad battery.
Figure 10:
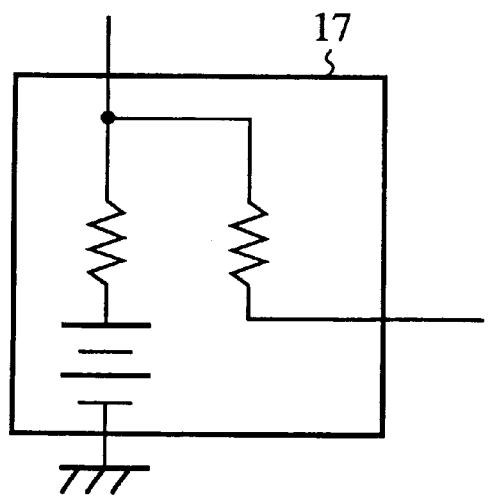
FIG. 10 is a block diagram showing the internal circuit of a lithium ion battery.

FIG. 7 is a block diagram showing a correction phase outputting section of a mobile communication terminal device according to a second embodiment of the present invention. Reference numeral 4 denotes a battery type identifying section for identifying a battery type to output battery type information. It should be noted that since components in FIG. 7 which are the same as or correspond to those shown in FIG. 1 are denoted by like numerals, the explanation of those components will be omitted. FIG. 8 is a diagram showing a table which stores correction phase information corresponding to both battery voltages at the time of voltage drops and battery types. This table is stored in a correction phase storage section 2. FIG. 9 is a block diagram showing the internal circuit of a nicad battery. FIG. 10 is a block diagram showing the internal circuit of a lithium ion battery.

The mobile communication terminal device according to the first embodiment selects correction phase information based on a battery voltage at the time of a voltage drop. However, a battery property such as the internal impedance may differ depending on the types of batteries, such as the nicad battery and the lithium ion battery. If this happens, the magnitude of a voltage drop produced when the transmission power amplifier 19 is turned ON may also differ. For example, since the output resistance of the lithium ion battery is larger than that of the nicad battery, the magnitude of a voltage drop produced when the transmission power amplifier 19 is turned ON in the case of the lithium ion battery is larger than that in the case of the nicad battery. Therefore, in order to select proper correction phase information, it is necessary to consider the type of a battery to be used as a power source. To accomplish the above object, a mobile communication terminal device according to the second embodiment of the present invention selects proper correction phase information according to both a battery voltage at the time of a voltage drop and the type of a battery 17.

Next, the mobile communication terminal device according to the second embodiment will be described with reference to FIG. 7. The battery type information output from the battery type identifying section 4 is, for example, set to "0" to indicate the nicad battery, shown in FIG. 9, as the battery 17, while it is set to "1" to indicate the lithium ion battery shown in FIG. 10. A correction phase outputting section 3 is connected to a voltage detector 1, the battery type identifying section 4, and a transmission ON/OFE control section 20, and receives a battery voltage at the time of a voltage drop, battery type information, and a transmission ON signal. Here, more than 3 battery types may be employed. In such a case, it is necessary to provide a table storing correction phase information for each battery type.

The correction phase outputting section 3 selects correction phase information from the table in the correction phase storage section 2 based on a battery voltage and battery type information at initiation of operation of the transmission power amplifier 19. The selected correction phase information is output to a phase adder 12 in synchronization with a baseband section operational clock.

It should be noted that the table shown in FIG. 8 storing correction phase information corresponding to both battery voltages and battery types may be created based on actual measurements. For example, a phase error in a transmission signal output from an antenna 21 is measured by an external measuring device, using a pseudo-power supply device whose output voltage and output resistance can be set, instead of using a battery. Then, the result is used to determine the battery voltage and battery type as well as the corresponding correction phase information to create or modify the table shown in FIG. 8.

As described above, the mobile communication terminal device according to the second embodiment of the present invention selects correction phase information according to both a battery voltage at the time of a voltage drop and battery type information identified by the battery type identifying section. Therefore, it is possible to select the most suitable correction phase information regardless of the type of a battery used as a power source.

Third Embodiment

Figure 11:
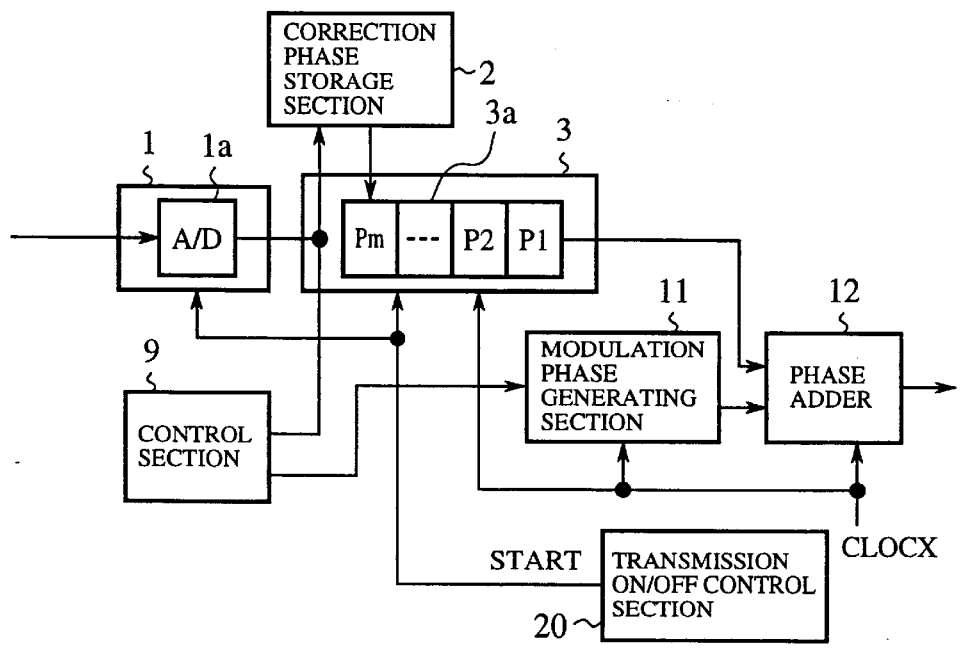
FIG. 11 is a block diagram showing a correction phase outputting section of a mobile communication terminal device according to a third embodiment of the present invention.
Figure 12:
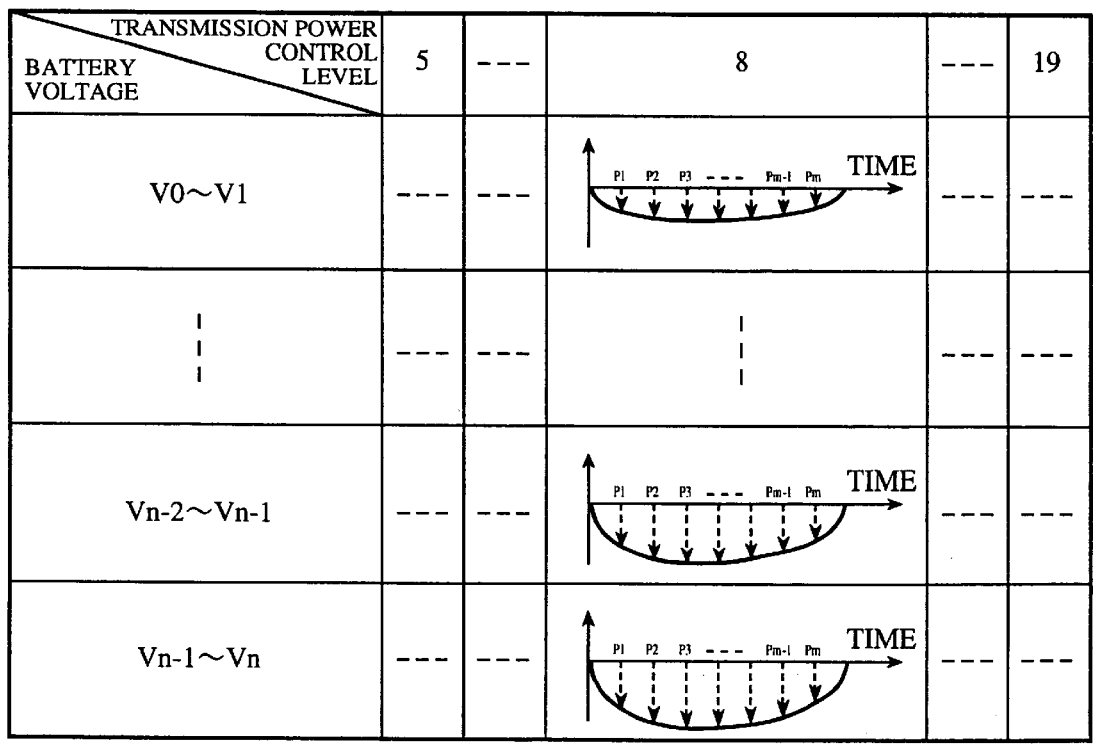
FIG. 12 is a diagram showing a table which stores correction phase information corresponding to both battery voltages produced at the time of voltage drops and transmission power control levels of a transmission power amplifier.

FIG. 11 is a block diagram showing a correction phase outputting section of a mobile communication terminal device according to a third embodiment of the present invention. Reference numeral 9 denotes a control section for outputting the transmission power control level of a transmission power amplifier 19 to a correction phase outputting section 3. It should be noted that since components in FIG. 11 which are the same as or correspond to those shown in FIG. 1 are denoted by like numerals, the explanation of those components will be omitted. FIG. 12 is a diagram showing a table which stores correction phase information corresponding to both battery voltages at the time of voltage drops and transmission power control levels. This table is stored in a correction phase storage section 2.

The mobile communication terminal device according to the first embodiment selects correction phase information based on a battery voltage at the time of a voltage drop. However, a battery voltage drop is triggered by a power demand by a circuit having large power consumption, such as the transmission power amplifier 19. Therefore, in order to select proper correction phase information, it is necessary to take transmission power control levels into account. To accomplish the above object, a mobile communication terminal device according to the third embodiment of the present invention selects the most suitable correction phase information based on both a battery voltage at the time of a voltage drop and a transmission power control level.

The mobile communication terminal device according to the third embodiment will be described with reference to FIG. 11. The correction phase outputting section 3 is connected to a voltage detector 1, the control section 9, and a transmission ON/OFF control section 20, and receives a battery voltage at the time of a voltage drop, a transmission power control level, and a transmission ON signal. The correction phase outputting section 3 selects correction phase information from the table in correction phase storage section 2 according to both a battery voltage and a transmission power control level at initiation of operation of the transmission power amplifier 19. The selected correction phase information is output to a phase adder 12 in synchronization with a baseband section operational clock.

As described above, since the mobile communication terminal device according to the third embodiment selects correction phase information based on both a battery voltage detected by a voltage detector at the time of a voltage drop and a transmission power control level output from a control section, it: is possible to select the most suitable correction phase information regardless of the output, level of the transmission power amplifier.

Fourth Embodiment

Figure 13:
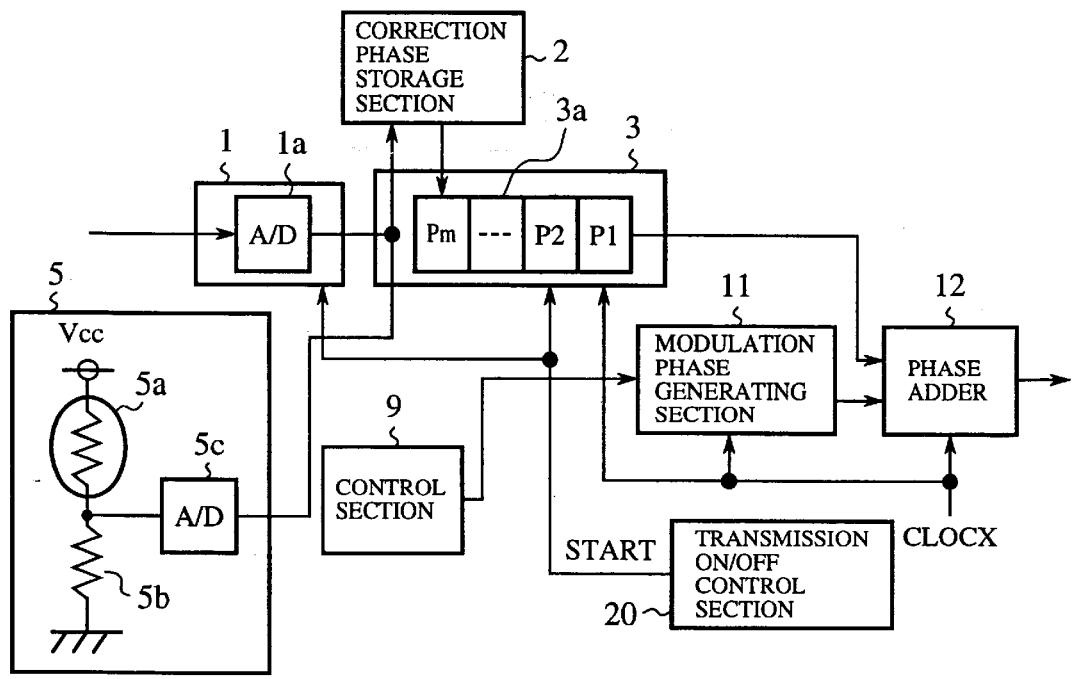
FIG. 13 is a block diagram showing a correction phase outputting section of a mobile communication terminal device according to a fourth embodiment of the present invention.
Figure 14:
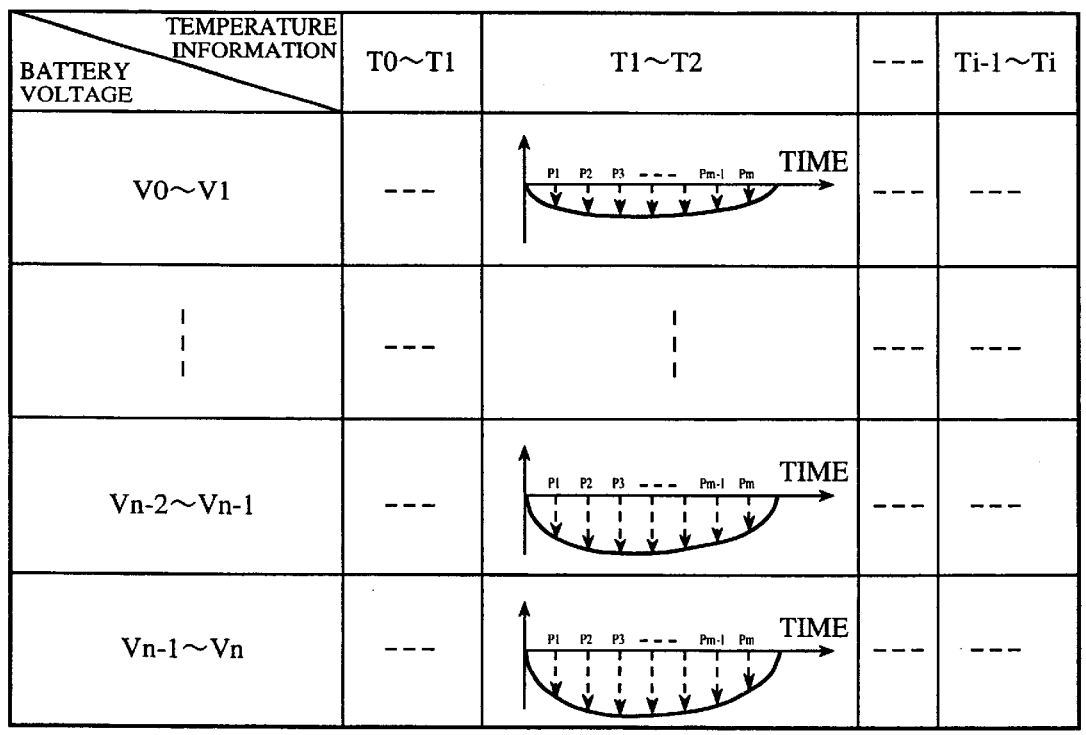
FIG. 14 is a diagram showing a table which stores correction phase information corresponding to both battery voltages produced at the time of voltage drops and terminal temperatures.

FIG. 13 is a block diagram showing a correction phase outputting section of a mobile communication terminal device according to a fourth embodiment of the present invention. Reference numeral 5 denotes a temperature detector for detecting the temperature of the terminal, and outputting the temperature information to a correction phase outputting section 3. It should be noted that since components in FIG. 13 which are the same as or correspond to those shown in FIG. 1 are denoted by like numerals, the explanation of those components will be omitted. FIG. 14 is a diagram showing a table which stores correction phase information corresponding to both battery voltages at the time of voltage drops and temperature information. This table is stored in a correction phase storage section 2.

The mobile communication terminal device according to the first embodiment selects correction phase information based on a battery voltage at the time of a voltage drop. However, even when a battery voltage supplied to a transmission local oscillator 16 at the time of a voltage drop remains the same as the normal battery voltage with no voltage drop, the phase error may be different due to a difference in the temperature of the terminal. To solve the above problem, a mobile communication terminal device according to the fourth embodiment of the present invention selects the most suitable correction phase information based on both a battery voltage at the time of a voltage drop and temperature information.

Next, the mobile communication terminal device according to the fourth embodiment will be described with reference to FIG. 13. The temperature detector 5 generates digital temperature information (temperature information) by dividing the output voltage Vcc of a voltage regulator by use of a thermister 5a and a resistor 5b, and A/D converting a voltage obtained as a result of the division by an A/D converter 5c. The temperature detector 5 outputs this temperature information to the correction phase outputting section 3. The correction phase outputting section 3 is connected to a voltage detector 1, the temperature detector 5, and a transmission ON/OFF control section 20, and receives a battery voltage at the time of a voltage drop, temperature information, and a transmission ON signal.

The correction phase outputting section 3 selects correction phase information from the table in the correction phase storage section 2 according to both a battery voltage and temperature information at initiation of operation of a transmission power amplifier 19. The selected correction phase information is output to a phase adder 12 in synchronization with a baseband section operational clock.

As described above, since the mobile communication terminal device according to the fourth embodiment of the present invention selects correction phase information based on a battery voltage detected by a voltage detector at the time of a voltage drop and temperature information detected by a temperature detector, it is possible to select the most suitable correction phase information regardless of the temperature of the terminal even when a component having a temperature characteristic is used.

Fifth Embodiment

Figure 15:
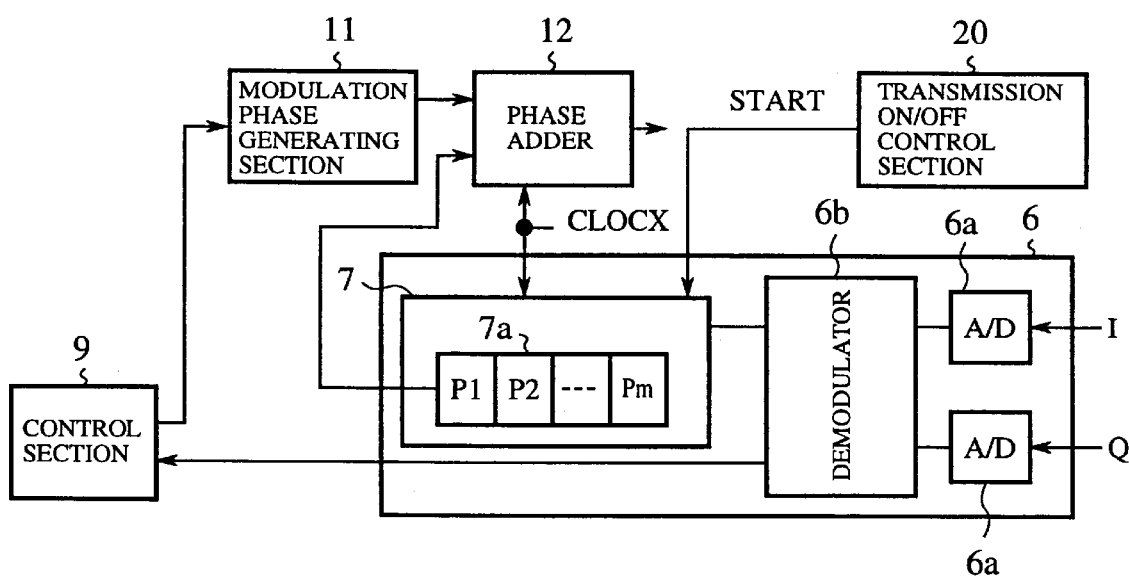
FIG. 15 is a block diagram showing a baseband demodulator of a mobile communication terminal device according to a fifth embodiment of the present invention.

FIG. 15 is a block diagram showing a baseband demodulator of a mobile communication terminal device according to a fifth embodiment of the present invention, and, specifically, illustrating the detailed configuration of the baseband demodulator 6 in FIG. 1. In FIG. 15, reference numeral 6 denotes a baseband demodulator while 7 denotes a correction phase outputting section. The baseband demodulator 6 is composed of an A/D converter 6a, a demodulator 6b, which includes a correction phase calculating section for measuring a phase error from a demodulated signal obtained as a result of demodulating a transmission signal to calculate correction phase information, and the correction phase outputting section 7 for outputting correction phase information. In FIG. 1, reference numeral 22 denotes an antenna switch; 23 denotes a quadrature demodulator; 24 denotes a reception local oscillator; and 25 denotes a speaker.

Since the mobile communication terminal devices of the present invention adopt the TDMA method in which transmission is made during each time slot, transmission and reception are not simultaneously carried out. Accordingly, it is possible to return a transmission signal sent from an antenna to a baseband demodulator for demodulation, and measure a phase error from the demodulation results, as in a fifth embodiment of the present invention described below. A mobile communication terminal device according to the fifth embodiment calculates correction phase information by which a phase error measured from a demodulated signal is cancelled, and outputs the calculated correction phase information to a phase adder.

Next, the mobile communication terminal device according to the fifth embodiment will be described with reference to FIGS. 15 and 1. A transmission signal amplified by a transmission power amplifier 19 is input to the quadrature demodulator 23 through the antenna switch 22. The quadrature demodulator 23 to which a reception carrier wave is supplied from the reception local oscillator 24 demodulates the input transmission signal. Analog I and analog Q signals output from the quadrature demodulator 23 are input to the baseband demodulator 6, and converted into digital I and digital Q signals by the A/D converter 6a. The digital I and digital Q signals output from the A/D converter 6a are converted into 1/0 reception data by the demodulator 6b. An ideal phase change is calculated from the 1/0 reception data, and compared with the reception I and reception Q signals to determine a phase error.

It is possible to perform such phase error measurement and the calculation of correction phase information by use of a digital signal processor (DSP) in the baseband demodulator 6b. The correction phase outputting section 7 outputs pieces of calculated correction phase information P1, P2, ... Pm to a phase adder 12. Since the correction phase outputting section 7 outputs pieces of correction phase information P1, P2, ... Pm to the phase adder 12 one by one in synchronization with a baseband section operational clock (CLOCK), using a transmission start signal from a transmission ON/OFF control section 20 as a triggers it is possible to change phase information in a baseband signal substantially in real time.

What is claimed is:

1. A mobile communication terminal device comprising:
a local oscillator for receiving a battery voltage supply, and generating a carrier wave which includes a phase error produced due to a variation of the battery voltage;
a voltage detector for detecting the battery voltage supplied to said local oscillator;
a correction phase storage section for storing pieces of correction phase information each corresponding to a phase error in said carrier wave;
a correction phase outputting section for selectively outputting said correction phase information according to the battery voltage detected by said voltage detector;
a baseband modulator for outputting a baseband signal which includes phase information corresponding to input transmission data, said phase information being changed according to said correction phase information; and
a modulator for modulating said carrier wave according to the baseband signal whose phase information has been changed.

2. The mobile communication terminal device as claimed in claim 1, wherein the voltage detector detects an output voltage of a voltage regulator at initiation of operation of an amplifier which amplifies a transmission signal output from the modulator, said voltage regulator regulating the battery voltage supplied to the local oscillator to a substantially constant voltage.

3. The mobile communication terminal device as claimed in claim 1, wherein the correction phase outputting section selectively outputs correction phase information according to both a battery voltage and battery type information output from a battery type identifying section which identifies a battery type and generates the battery type information.

4. The mobile communication terminal device as claimed in claim 1, wherein the correction phase outputting section selectively outputs correction phase information according to both a battery voltage and a transmission output of an amplifier which amplifies a transmission signal output from the modulator.

5. The mobile communication terminal device as claimed in claim 1, wherein the correction phase outputting section selectively outputs correction phase information according to both a battery voltage and temperature information output from a temperature detector which detects a temperature of the terminal device.

6. The mobile communication terminal device as claimed in claim 1, wherein the correction phase outputting section outputs correction phase information to the baseband modulator at initiation of operation of an amplifier which amplifies a transmission signal output from the modulator.

7. A mobile communication terminal device comprising:
a local oscillator for receiving a battery voltage supply, and generating a carrier wave which includes a phase error produced due to a variation of the battery voltage;
a modulator for modulating said carrier wave to generate a transmission signal;
a baseband demodulator having a correction phase calculating section for measuring the phase error from a demodulated signal obtained by demodulating said transmission signal to calculate correction phase information, and a correction phase outputting section for outputting said correction phase information; and
a baseband modulator for outputting to said modulator a baseband signal which includes phase information corresponding to input transmission data, said phase information being changed according to said correction phase information.

* * * * *

UNITED STATES PATENT AND TRADEMARK OFFICE
CERTIFICATE OF CORRECTION

PATENT NO. : 6,282,411 B2
DATED : August 28, 2001
INVENTOR(S) : Koji Higuchi

It is certified that error appears in the above-identified patent and that said Letters Patent is hereby corrected as shown below:

Drawings, Figures 2, 7, 11, 13 and 15 should be corrected by changing "CLOCX" to -- CLOCK -- as shown in the following corrected Figures.

FIG.2

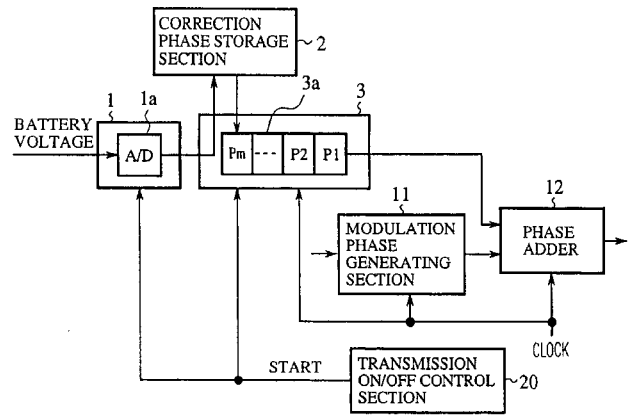

FIG.7

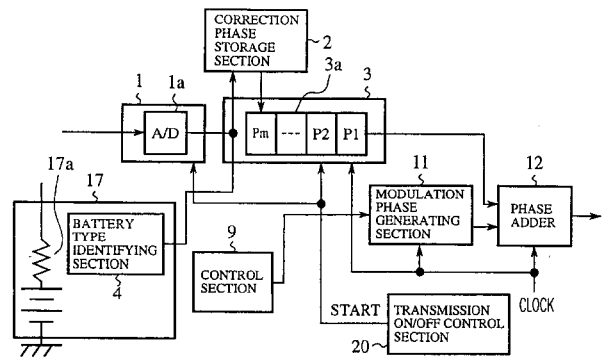

UNITED STATES PATENT AND TRADEMARK OFFICE
CERTIFICATE OF CORRECTION

PATENT NO. : 6,282,411 B2
DATED : August 28, 2001
INVENTOR(S) : Koji Higuchi

It is certified that error appears in the above-identified patent and that said Letters Patent is hereby corrected as shown below:

FIG.11

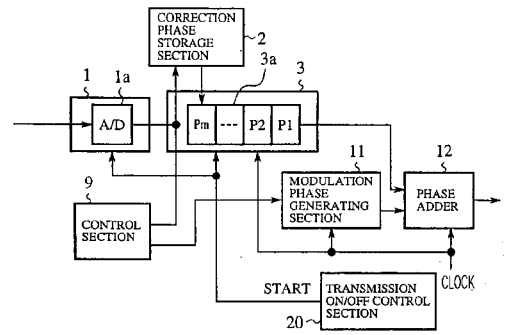

FIG.13

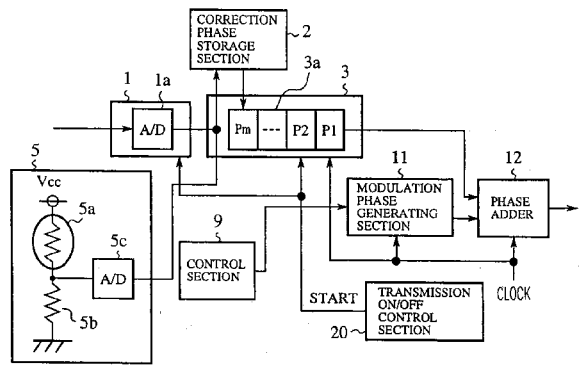

FIG.15

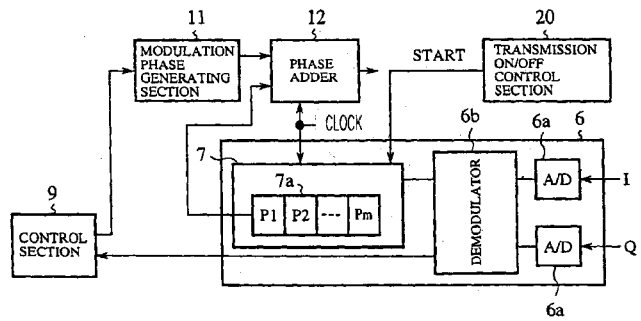

UNITED STATES PATENT AND TRADEMARK OFFICE
CERTIFICATE OF CORRECTION

PATENT NO.    : 6,282,411 B2
DATED         : August 28, 2001
INVENTOR(S)   : Koji Higuchi It is certified that error appears in the above-identified patent and that said Letters Patent is hereby corrected as shown below:

Column 3,
Line 4, change "Aµ" to -- µ --.

Column 10,
Line 15, change "it:is" to -- it is --.
Line 16, change "output, level" to -- output level --.

Column 11,
Line 60, change "ONIOFF" TO -- ON/OFF --.

Signed and Sealed this

Second Day of September, 2003

JAMES E. ROGAN
*Director of the United States Patent and Trademark Office*